United States Patent
George et al.

(10) Patent No.: US 10,048,352 B2
(45) Date of Patent: Aug. 14, 2018

(54) DETERMINATION OF LOCATION OF A MOBILE DEVICE HAVING TIME-STAMPING CAPABILITY

(71) Applicant: Avago Technologies General IP (Singapore) Pte. Ltd., Singapore (SG)

(72) Inventors: Manoj Mathew George, Bangalore (IN); Mark Gonikberg, Los Altos Hills, CA (US)

(73) Assignee: Avago Technologies General IP (Singapore) Pte. Ltd.

( * ) Notice: Subject to any disclaimer, the term of this patent is extended or adjusted under 35 U.S.C. 154(b) by 7 days.

(21) Appl. No.: 14/604,103

(22) Filed: Jan. 23, 2015

(65) Prior Publication Data
US 2015/0212193 A1    Jul. 30, 2015

Related U.S. Application Data

(60) Provisional application No. 61/931,354, filed on Jan. 24, 2014.

(51) Int. Cl.
| | |
|---|---|
| *H04L 1/00* | (2006.01) |
| *G01S 5/10* | (2006.01) |
| *H04W 4/02* | (2018.01) |
| *H04W 84/12* | (2009.01) |

(52) U.S. Cl.
CPC .............. *G01S 5/10* (2013.01); *H04W 4/023* (2013.01); *H04W 84/12* (2013.01)

(58) Field of Classification Search
CPC .......... G01S 5/10; H04W 4/023; H04W 84/12
See application file for complete search history.

(56) References Cited

U.S. PATENT DOCUMENTS

| | | | |
|---|---|---|---|
| 2010/0246419 A1* | 9/2010 | Batta ......................... | G01S 5/14 370/252 |
| 2013/0029685 A1* | 1/2013 | Moshfeghi .............. | G01S 19/48 455/456.1 |

(Continued)

*Primary Examiner* — Abdelnabi O Musa
(74) *Attorney, Agent, or Firm* — Sterne, Kessler, Goldstein & Fox P.L.L.C.

(57) ABSTRACT

Determining a mobile device's location, includes receiving, by the mobile device, a first packet from a first access point and generating a first time-stamp representing the first packet's arrival time; receiving, by the mobile device, a second packet from a second access point and generating a second time-stamp representing the second packet's arrival time; using these to determine the difference between the arrival times of the first and second packet at the mobile device; receiving, by the mobile device, first information representative of the first packet transmission time and second information representative of the second packet transmission time, the first and second information used to find the interval between the transmission of the first and second packets from the first and second access points respectively; determining, by the mobile device, the difference between the flight-times of the first and second packets to the mobile device; and determining, by the mobile device, the difference between the distance from itself to the first access point, and the distance from itself to the second access point and doing this over sufficient pairs of access points to find its location.

23 Claims, 3 Drawing Sheets

(56) References Cited

U.S. PATENT DOCUMENTS

| | | | | |
|---|---|---|---|---|
| 2013/0316728 A1* | 11/2013 | Bradley | ................ | H04W 24/00 |
| | | | | 455/456.1 |
| 2014/0010224 A1* | 1/2014 | Lee | ...................... | H04W 84/12 |
| | | | | 370/338 |
| 2014/0233550 A1* | 8/2014 | Hansen | ................ | H04W 4/023 |
| | | | | 370/338 |
| 2014/0315572 A1* | 10/2014 | Hsu | .......................... | G01S 5/10 |
| | | | | 455/456.1 |
| 2015/0094085 A1* | 4/2015 | Agrawal | ............ | A01K 1/0114 |
| | | | | 455/456.1 |
| 2015/0181553 A1* | 6/2015 | Segev | .................. | H04W 64/00 |
| | | | | 455/456.1 |

* cited by examiner

DETERMINATION OF LOCATION OF A MOBILE DEVICE HAVING TIME-STAMPING CAPABILITY

CROSS-REFERENCE TO RELATED APPLICATIONS

This nonprovisional application claims the benefit of U.S. provisional patent application No. 61/931,354, filed 24 Jan. 2014, entitled "DETERMINATION OF LOCATION OF A MOBILE DEVICE HAVING TIME-STAMPING CAPABILITY;" the entirety of which is hereby incorporated by reference.

FIELD OF THE DISCLOSURE

The present disclosure relates generally to determining the location of a mobile device.

BACKGROUND

The use of mobile devices such as mobile phones, smartphones, tablets and similar devices has become common. Many mobile devices include a combination of several wireless subsystems such as, cellular, Wi-Fi, Bluetooth, Near-Field Communication (NFC), Global Positioning System (GPS) and so on.

The inclusion of GPS subsystems in mobile devices has facilitated the development and wide distribution of applications that make use of the fact that such devices are location-aware. Many such applications are in a category referred to as location-based services.

It is known that GPS signals may be inadequate for a mobile device to determine its location in some environments.

BRIEF DESCRIPTION OF THE DRAWINGS

Various exemplary embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments. References in the Detailed Description to "one exemplary embodiment," "an illustrative embodiment", "an exemplary embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other embodiments are possible, and modifications may be made to the exemplary embodiments within the spirit and scope of the disclosure.

It is to be understood that the phraseology or terminology herein is for the purpose of description and not of limitation, such that the terminology or phraseology of the present specification is to be interpreted by those skilled in relevant art(s) in light of the teachings herein.

TERMINOLOGY

The terms, chip, die, integrated circuit (IC), semiconductor device, and microelectronic device, are often used interchangeably in the field of electronics.

With respect to chips, it is common that power, ground, and various signals may be coupled between them and other circuit elements via physical, electrically conductive connections. Such a point of connection may be referred to as an input, output, input/output (I/O), terminal, line, pin, pad, port, interface, or similar variants and combinations. Although connections between and amongst chips are commonly made by way of electrical conductors, those skilled in the art will appreciate that chips and other circuit elements may alternatively be coupled by way of, but not limited to, optical, mechanical, magnetic, electrostatic, and electromagnetic interfaces.

The term "anchor," as used herein, refers to a device having a known location, the ability to receive and time-stamp wirelessly transmitted packets, and further having the ability to communicate, directly or indirectly, with a mobile device.

The expression "access point," as used herein, refers generally to a device with the functionality of a wireless local area network (WLAN) access point. The air interfaces of such devices commonly operate in accordance with the IEEE 802.11 family of specifications. Such devices are often referred to as Wi-Fi devices. This general statement is not intended to limit the claims to specifically to Wi-Fi access points.

The expression "mobile device," as used herein, refers to a device such as a mobile phone, a smartphone, a smartwatch, a tablet and other small form-factor, portable devices with wireless communication capability.

The term "packet," as used herein, refers to a discrete amount of information transmitted. The packets are not limited to any particular format, modulation scheme, frequency, or size.

Overview

Various embodiments of the present disclosure provide for the determination of the location of a mobile device and include time-stamping a packet received from each of a plurality of transmitters each at a known location, and using information provided by a reference device at a known location that has also received and time-stamped those packets. Since the absolute flight times of the packet from the transmitters to the mobile device cannot be determined directly by the mobile device, differences in arrival times of the packets at each of the reference device and the mobile are used. From the time-stamps at the reference device, the difference in the arrival times of the packets is known. But these are in terms of the timer(s) running at the reference device. And since the time-stamps at the mobile device have no relationship to the time-stamps in the reference device (since these are two independent timers on separate devices) it cannot be determined when a packet was transmitted in terms of the timer in the mobile device. Thus, with arrival time stamps at the mobile device the absolute flight times of the packets from the access points to the mobile device cannot be determined.

But the deltas, i.e., Time Differences Of Arrival (TDOA) can be determined by embodiments in accordance with the present disclosure. The reference device time-stamps packets transmitted from the access points in terms of free running timers in the reference device. Using these receive time stamps at the reference device, the time interval between the transmissions of packets from any two access points can be calculated. (This is the time interval between their arrival at the reference device compensated by their time of flight as calculated from the distance of the reference device from the two access points). The mobile device also time stamps the packets transmitted from the access points in terms of free running timers in the mobile device. Thus the time interval between their arrivals at the mobile device can be calculated. The difference between the time interval between transmissions from the access points and the interval between their arrivals at the mobile device gives the difference in time of flight from the two access points to the mobile device. That is, we can determine the time difference of arrival of the packets from the two access points at the mobile device, had the two access points transmitted at the same time.

Figure 1:
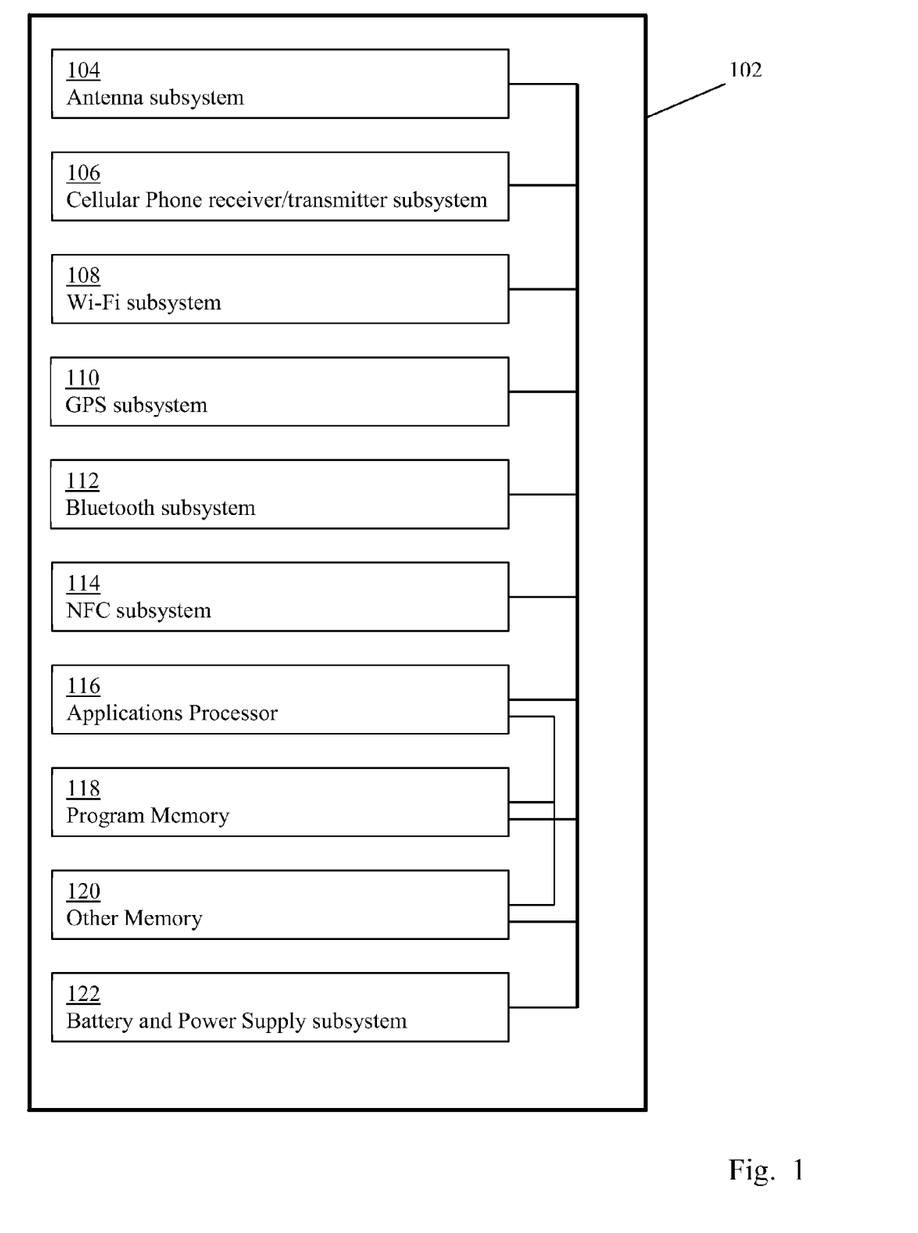
FIG. 1 is a high-level block diagram of an exemplary mobile device.

By way of example and not limitation, a mobile device can represent a mobile communication device, such as a cellular phone or a smartphone, a mobile computing device, such as a tablet computer or a laptop computer, or any other electronic device that is capable of communicating information over communication networks that will be apparent to those skilled in the relevant art(s) without departing from the spirit and scope of the present disclosure. FIG. 1 illustrates a high-level architectural view of an exemplary mobile device 102. Mobile device 102 includes various hardware blocks and also typically includes program code executed by an applications processor to implement the functionality of the smartphone. In the exemplary embodiment of FIG. 1, mobile device 102 includes an antenna subsystem 104, a cellular phone receiver/transmitter subsystem 106, a Wi-Fi subsystem 108, a Global Positioning System (GPS) subsystem 110, a Bluetooth subsystem 112, a Near-Field Communication (NFC) subsystem 114, an applications processor 116, a program memory 118, other memory 120, and a battery and power supply subsystem 122. Not all of the aforementioned subsystems are required nor are other subsystems excluded disclosure of this exemplary embodiment of a smartphone. By way of example and not limitation, NFC subsystem 114 could be removed and/or a camera subsystem (not shown), an audio subsystem (not shown) or a display subsystem (not shown) could be added. The various subsystems are interconnected as appropriate to transfer power and data as needed for the desired operation(s) of the smartphone.

The antenna subsystem 104 operates as an interface between mobile device 102 and other communication devices, such as other mobile devices, access points, base stations, or the like to provide some examples. Antenna subsystem 104 can include one or more antennas for communicating information between mobile device 102 and the other communication devices. These one or more antennas can communicate the information between cellular phone receiver/transmitter subsystem 106, Wi-Fi subsystem 108, GPS subsystem 110, Bluetooth subsystem 112, NFC subsystem 114, applications processor 116, the program memory 118, other memory 120, and/or battery and power supply subsystem 122.

Cellular phone receiver/transmitter subsystem 106 provides wireless communication between mobile device 102 and another cellular capable device over a cellular network in accordance with various cellular communication standards such as a Generation Partnership Project (3GPP) Long Term Evolution (LTE) communications standard, a fourth generation (4G) mobile communications standard, or a third generation (3G) mobile communications standard to provide some examples. Cellular phone receiver/transmitter subsystem 106 can communicate with one or more transceivers, referred to as base stations or access points, within the cellular network to provide voice or data communications between the mobile device 102 and another cellular capable device.

Wi-Fi subsystem 108 provides wireless communication between mobile device 102 and another WLAN capable device over a wireless communication network in accordance with various networking protocols such as a Wi-Fi communications standard to provide an example, or any other RF standard or protocol. Wi-Fi subsystem 108 can operate as an access point to provide communications between other WLAN capable devices and a communication network, or as a client to communicate with another access point, such as for example, a wireless router to access the communication network.

Global Positioning System (GPS) subsystem 110 receives various signals from various satellites to calculate a position of mobile device 102. GPS subsystem 110 is typically implemented using a Global Navigation Satellite System (GNSS) receiver that uses the GPS, GLONASS, Galileo and/or Beidou systems for calculating the position of mobile device 102.

Bluetooth subsystem 112 provides wireless communication between the mobile device 102 and another Bluetooth capable device in accordance with various Bluetooth or Bluetooth Low Energy (BLE) standards. Bluetooth subsystem 112 includes a transmitter and a receiver. Bluetooth subsystem 112 is configurable to operate in a master mode of operation to initiate communications with another Bluetooth capable device or in a slave mode of operation to receive communications from another Bluetooth capable device.

NFC subsystem 114 provides wireless communication between the mobile device 102 and another NFC capable device in accordance with various NFC standards. NFC subsystem 114 is configurable to operate in an initiator, or a reader, mode of operation to initiate communications with another NFC capable device or in a target, or a tag, mode of operation to receive communications from another NFC capable device. Additionally, NFC subsystem 114 can derive or harvest power from communications received from this other NFC capable device when operating in the tag mode of operation.

Applications processor 116 executes logic and/or or code stored within program memory 118 and/or other memory 120 to control overall operation and/or configuration of mobile device 102. Additionally, applications processor 116 can execute one or more applications, which can be stored in program memory 118 and/or other memory 120, such as Short Message Service (SMS) for text messaging, electronic mailing, and/or audio and/or video recording to provide some examples, and/or software applications such as a calendar and/or a phone book to provide some examples.

Battery and power supply subsystem 122 is responsible for battery and power system management of mobile device 102. Battery and power supply subsystem 122 can monitor power connections and battery charges and/or to charge batteries when necessary.

In this disclosure, a location scheme is described and illustrated in which the location of an exemplary mobile device, such as mobile device 102 to provide an example, can be determined. Embodiments are configured to operate in the presence of one or more devices having a known location, and a reference device, the location of which is also known, capable of time-stamping received packets. Various embodiments are disclosed that may be used in an indoor environment. In some exemplary embodiments, the one or more known devices can represent one or more WLAN access points. In other exemplary embodiments, the one or more known devices can represent beacons having known locations. In the disclosed embodiments, the exemplary mobile device is configured to time-stamp at least a portion of the packets received from the one or more known devices.

It is noted that the location of the exemplary mobile device can be determined from its difference in distance to a plurality of the known devices each of which has a known location. The mathematical principles of this type of "triangulation" are known. In the disclosed embodiments, the exemplary mobile device seeking to determine its location, collects a range of information from a plurality of sources from which its position, or location, can be determined. In an embodiment, this determination does not depend on actively receiving GPS signals.

As noted above, advances in semiconductor technology have allowed designers and manufacturers to continually add new features, functions, and capabilities to the integrated circuits used to assemble exemplary mobile devices. For those exemplary mobile devices that include the capability to time-stamp received packets, various exemplary methods of improving the accuracy of location determination are described.

In the exemplary embodiments, the one or more known devices provide wireless coverage over the area in which the location of the exemplary mobile device is to be determined. The exemplary mobile device includes the capability of time-stamping packets received from the one or more known devices. The reference device is used to provide a time reference for packets received from the one or more known devices by time-stamping the packets it receives. Advantageously, the location of the exemplary mobile device is determined within the exemplary mobile device itself rather than by the wireless network infrastructure. In this way, the location of the exemplary mobile device may be determined and maintained in private, namely the location of the exemplary mobile device is unknown to components of the wireless network infrastructure. A further advantage of this approach is that it reduces the computational load on the network infrastructure since the location determination is performed by the mobile device rather than the network infrastructure.

In alternative embodiments, rather than implementing the one or more known devices with receive and transmit network interface functionality, simpler known devices with reduced functionality that simply transmit packets from the known locations can be used to provide the information used in determining the location of the exemplary mobile device.

Figure 2:
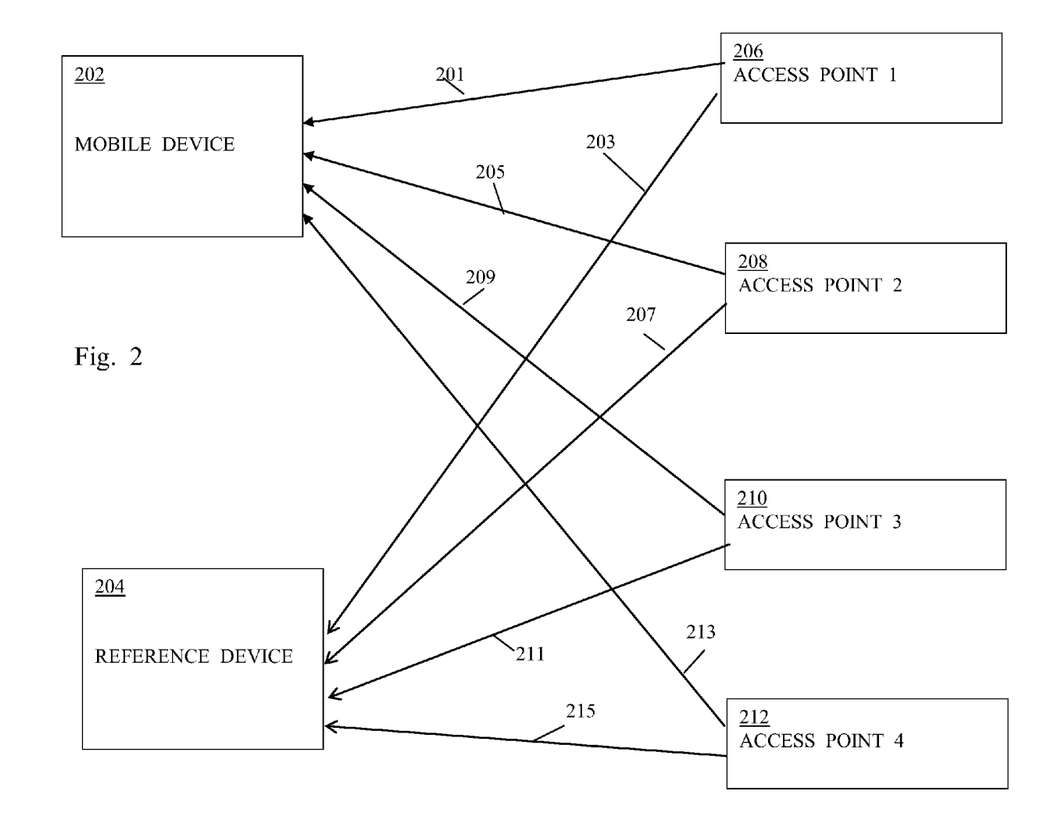
FIG. 2 is a diagram illustrating an exemplary arrangement of a mobile device in communication range of a reference device and a plurality of access points.

In the exemplary configuration of FIG. 2, knowing the difference in distance to the known location of each of access points 206, 208, 210 and 212 allows mobile device 202 to calculate its position In the configuration shown in FIG. 2, mobile device 202 is unaware of the locations of access points 206, 208, 210 and 212. And mobile device 202 is unaware of the location of reference device 204. In this exemplary embodiment, mobile device 202 is configured to time-stamp at least a portion of the packets received from the access points 206, 208, 210 and 212. Unfortunately, simply knowing when a packet arrives from one of access points 206, 208, 210 and 212 does not provide enough information to determine the location of mobile device 202. Additional information is required for the time-stamp information taken by mobile device 202 to be used in determining the location of mobile device 202.

Still referring to FIG. 2, it can be seen that reference device 204 receives the same packets that are received by mobile device 202. Because the locations of reference device 204 and access points 206, 208, 210 and 212 are known, the distances between them are also known, or easily computed. Since reference device 204 is configured to time-stamp the packets that it receives from access points 206, 208, 210 and 212, reference device 204 has the time-of-arrival of each packet received from the access points 206, 208, 210 and 212, the distance travelled by those packets in propagating from the access points 206, 208, 210 and 212 to reference device 204, and the propagation speed of the packets (a known physical quantity), reference device 204 can determine the time at which each of those packets was transmitted. Various embodiments in accordance with this disclosure enable mobile device 202 to determine its location by wirelessly receiving packets from a plurality of transmitters, without knowing when those packets were transmitted. To accomplish this, mobile device 202 determines the difference in distance of the paths between itself and the transmitting access points 206, 208, 210 and 212 without knowing the absolute time of flight of the packets from those transmitting access points.

Exemplary Embodiment

The reference device 204, also referred to as a single anchor, can be used to generate time reference information for the mobile device 202 by time-stamping the packets it receives from the access points 206, 208, 210 and 212. The same packets from the access points are also captured by the mobile device 202 and time-stamped. By using the time reference information provided by the reference device 204, the difference in flight-times of the packets from the access points 206, 208, 210 and 212 to the mobile device 202 can be determined. As noted above, the reference device 204 knows the arrival time, distance travelled and speed of propagation of the packets from the access points 206, 208, 210 and 212. With this information, the reference device 204 may determine the time at which the packets were transmitted from the access points 206, 208, 210 and 212. By then communicating this to the mobile device 202, the time at which the packets originated from their respective access points 206, 208, 210 and 212, the mobile device 202 has the time of origination, the time of reception, the speed of propagation (a known physical quantity) and from those can determine its difference in distance from each of the access points 206, 208, 210 and 212. By knowing the difference in its distance from each of the known locations of the access points 206, 208, 210 and 212, mobile device 202 can determine its own location.

In exemplary embodiments, the location of the mobile device 202 is determined by first determining the flight times of at least one packet from each one of a plurality of access points 206, 208, 210 and 212 to the reference device 204 having the known location, and further determining the arrival time of those same packets at the mobile device 202.

In the exemplary arrangement shown in FIG. 2, the mobile device 202 is disposed within communication range of the reference device 204, and the access points 206, 208, 210 and 212. Although the mobile device 202 is within communication range of the reference device 204, and the access points 206, 208, 210 and 212, the location of the mobile device 202 is unknown and is sought to be determined. Reference device 204 receives and time stamps packets transmitted from each of the access points 206, 208, 210 and 212 respectively. The reference device 204 is disposed at a known location. The mobile device 202 receives and time stamps packets transmitted from each of the access points 206, 208, 210 and 212 respectively.

Reference device 204 may be disposed such that it is physically fixed in place at a known location. Alternatively, reference device 204 may be movable from one location to another. Although reference device 204, can be relocated, the location of reference device 204 is known at some point in the disclosed method.

Still referring to the exemplary arrangement of FIG. 2, first access point 206 wirelessly transmits a first packet. The first packet propagates along a first path 201 to mobile device 202 and along a second path 203 to reference device 204. Second access point 208 wirelessly transmits a second packet. The second packet propagates along a third path 205 to mobile device 202 and along a fourth path 207 to reference device 204. Third access point 210 wirelessly transmits a third packet. The third packet propagates along a fifth 209 to mobile device 202 and along a sixth path 211 to reference device 204. Fourth access point 212 wirelessly transmits a fourth packet. The fourth packet propagates along a seventh path 213 to mobile device 202 and along and eighth path 215 to reference device 204.

Figure 3A:
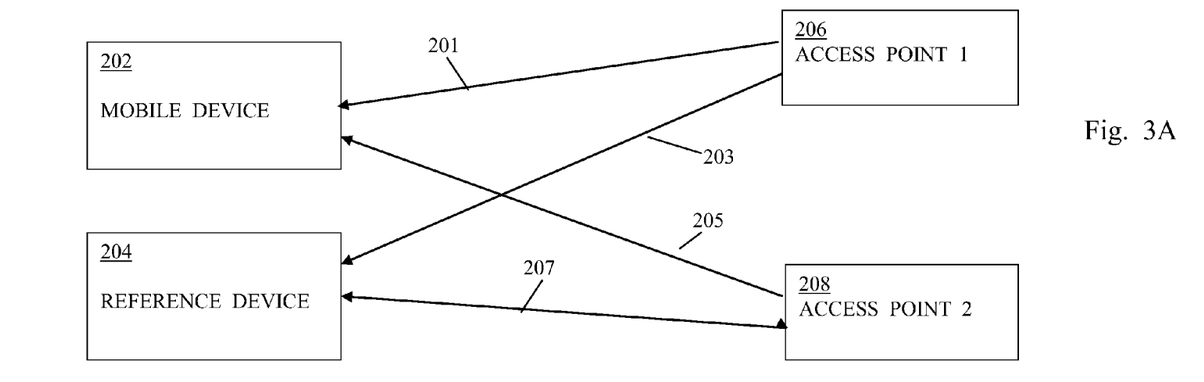
FIG. 3A is a simplified version of FIG. 2 and shows only two access points instead of four.
Figure 3B:
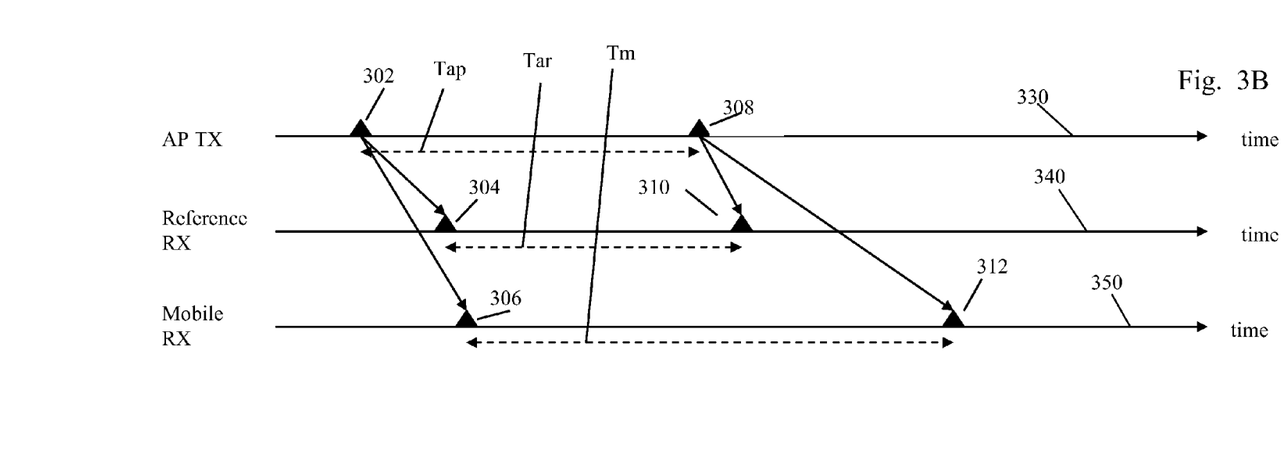
FIG. 3B is a diagram for use in conjunction with FIG. 3A, illustrating the timing relationships between when the various packets transmitted by the access points are received respectively by the mobile device and the reference device.

FIGS. 3A and 3B show, in an exemplary arrangement, various propagation paths for packets transmitted from the access points, and the timing relationships between the arrival times of those packets at a mobile device and at a reference device. It is noted that, for simplicity of description, only two access points and the propagation paths of their transmissions are shown in FIG. 3A so that the method of determining the delta between the flight times of the packets from the two access points to the to the mobile device can be illustrated. In this manner the delta between the flight times of the packets from any two access points and the mobile device can be found. To find the location of the mobile device in three-dimensional space, multiple access points are needed as is typical in a Time Difference of Arrival (TDOA) scheme.

Referring to FIG. 3A, mobile device 202 is disposed within communication range of reference device 204, first access point 206, and second access point 208. a mobile device 202 is disposed within communication range of a reference device 204, a first access point 206, and second access point 208. First access point 206 wirelessly transmits a first packet. The first packet propagates along first path 201 to mobile device 202 and along second path 203 to reference device 204. Second access point 208 wirelessly transmits a second packet. The second packet propagates along third path 205 to mobile device 202 and along fourth path 207 to reference device 204.

FIG. 3B shows three timelines 330, 340 and 350. Timeline 330 shows the points in time 302, 308, in an exemplary arrangement, at which access point 206 transmits a first packet and access point 208 transmits a second packet. The magnitude of the difference in time between the transmission of the first packet and the second packet is indicated by dashed line Tap. Timeline 340 shows the points in time 304, 310, in this exemplary arrangement, at which the first packet after propagating along second path 203 is received by reference device 204, and at which the second packet after propagating along fourth path 207 is received by reference device 204. The magnitude of the difference in time between arrival of the first packet and the arrival of the second packet at reference device 204 is indicated by dashed line Tar. Timeline 350 shows the points in time 306, 312, in this exemplary arrangement, at which the first packet after propagating along first path 201 is received by mobile device 202, and at which the second packet after propagating along third path 205 is received by mobile device 202. The magnitude of the difference in time between arrival of the first packet and the arrival of the second packet at mobile device 202 is indicated by dashed line Tm. Since the location of reference device 204 and the location of access points 206, 208, 210 and 212 are known, the time at which the access points transmitted packets can be determined. This is described in conjunction with the illustrations of FIGS. 3A and 3B.

Compensating for Oscillator Differences

It is known that there may be a difference in the time-base of the mobile device 202 and the reference device 204. This difference may be relatively small, such as in parts per million (ppm). This difference in time-base may be due in differences in the crystals or crystal oscillator circuits in each of those devices or may be due to environmental factors, such as for example, temperature, at their respective locations.

The difference, or delta, in time-base between the mobile device 202 and reference device 204 may be found by determining the delta in arrival times between the same two packets from any one of the access points 206, 208, 210 and 212.

Thus the delta between the times when the access points 206, 208, 210 and 212 transmitted their respective packets can be determined. By comparing this delta with the delta between the times when these packets were received by the mobile device 202, the delta in the time-of-flight of the packets from various access points to the mobile device can be generated.

Still referring to FIGS. 3A and 3B:
Let the time of flight of a packet from access point x to:

reference device=be represented by Taxr.

Ta1r=Time instant 304−Time instant 302.

Ta2r=Time instant 310−Time instant 308.

These quantities are known since the locations of reference device and access points are known. Let the time of flight of a packet from access point x to mobile device be represented by Taxm.

Ta1m=Time instant 306−Time instant 302.

Ta2m=Time instant 312−Time instant 308.

Now, Tar can be calculated by the reference device. And Tap can be found from the following.

$$Tap = Ta1r + Tar - Ta2r.$$

Similarly, $$Tap = Ta1m + Tm - Ta2m.$$

Re-arranging gives:

$$Ta2m - Ta1m = Tm - Tap.$$

Since all the quantities on the right-hand side are known, the difference in the time of flights of the packets from the two access points to the mobile device can be generated.

In one illustrative embodiment, a method of determining a location of a mobile device, includes, receiving, by the mobile device, a first packet from a first access point; and generating a first time-stamp representing a time at which the first packet is received at the mobile device; receiving, by the mobile device, a second packet from a second access point and generating a second time-stamp representing a time at which the second packet is received at the mobile device; receiving, by the mobile device, first information representative of the time of transmission of the first packet and second information representative of the time of transmission of the second packet, the first and second information used to find the interval between the transmission of the first and second packets from the first and second access points respectively; determining, by the mobile device, the difference in the flight-times of the first and second packets; and determining, by the mobile device, the difference between a distance from itself to the first access point and a distance from itself to the second access point.

In some embodiments, the mobile device includes a GPS receiver providing location data to the mobile device when the GPS receiver can acquire signals from the minimum number of satellites needed to process GPS signals and produce location data.

In another illustrative embodiment, a method of determining a location of a mobile device, includes receiving, by a reference device having a known location, a first packet from a first access point having a known location and generating a first time-stamp representing a time at which the first frame is received at the reference device; receiving, by the reference device, a second packet from a second access point and generating a second time-stamp representing a time at which the second frame is received at the reference device; determining a time of transmission of the first packet based on the first time-stamp, the speed of propagation, and the distance between the reference device and the first access point; determining a time of transmission of the second packet based on the second time-stamp, the speed of propagation, and the distance between the reference device and the second access point; and transmitting, by the reference device, the time of transmission of the first packet, the location of the first access point, the time of transmission of the second packet, and the location of the second access point.

In another illustrative embodiment, a system includes a first access point having a first known location, and configured to transmit a first packet; a second access point having a second known location, and configured to transmit a second packet; a third access point having a third known location, and configured to transmit a third packet; a reference device having a fourth known location, and configured to time-stamp the first, second and third packets received respectively from each of the first, second and third access points; wherein the reference device is further configured to determine a time of transmission of the first packet based on a time-stamp of the first packet, the speed of propagation, and the distance between the reference device and the first access point; and wherein the reference device is further configured to transmit the time of transmission of the first packet and the location of the first access point.

CONCLUSION

The disclosure is also directed to computer program products comprising software stored on any computer useable medium. Such software, when executed in one or more data processing device, causes a data processing device(s) to operate as described herein. Various embodiments may employ any computer useable or readable medium, known now or in the future. Examples of non-transitory computer-useable media include, but are not limited to, primary storage devices (e.g., any type of volatile or non-volatile memory devices), secondary storage devices (e.g., hard drives, floppy disks, CD ROMS, ZIP disks, tapes, magnetic storage devices, optical storage devices, etc.). Other forms of computer-useable media from which such software may be perceived include, but are not limited to, communication media (e.g., wired and wireless communications networks, local area networks, wide area networks, intranets, etc.).

The exemplary embodiments have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It is to be appreciated that the Detailed Description section, and not the Abstract of the Disclosure, is intended to be used to interpret the claims. The Abstract of the Disclosure is not intended to limit the subjoined claims in any way.

It will be apparent to those skilled in the relevant art(s) that various changes in form and detail can be made therein without departing from the spirit and scope of the disclosure. Thus, the subjoined claims and their equivalents should not be limited by any of the above-described exemplary or illustrative embodiments.

What is claimed is:

1. A method of determining a location of a mobile device having an initially unknown location, comprising:
   receiving, by the mobile device, a first packet from a first access point and generating a first time-stamp representing a time at which the first packet is received at the mobile device;
   receiving, by the mobile device, a second packet from a second access point and generating a second time-stamp representing a time at which the second packet is received at the mobile device;
   receiving, by the mobile device, first information and second information from an anchor having a known location, the first information being representative of a time of transmission of the first packet and second information being representative of a time of transmission of the second packet, the first and second information configured to be used to find an interval between the transmission of the first and second packets from the first and second access points respectively, wherein the first information and the second information are based on the first and second packets received by the anchor;

determining, by the mobile device, a difference in flight-times of the first and second packets based on the received first and second information; and determining, by the mobile device, a difference between a distance from itself to the first access point, and a distance from itself to the second access point to determine the location based on the determined difference in the flights-times.

2. The method of claim 1, further comprising:

receiving, by the mobile device, a third packet from a third access point; and generating a third time-stamp representing a time at which the third packet is received at the mobile device; and receiving, by the mobile device, third information from the anchor, the third information being representative of a time of transmission of the third packet.

3. The method of claim 2, further comprising:

receiving, by the mobile device, a fourth packet from a fourth access point; and generating a fourth time-stamp representing a time at which the fourth packet is received at the mobile device; and receiving, by the mobile device, fourth information from the anchor, the fourth information being representative of a time of transmission of the fourth packet.

4. The method of claim 2, wherein the third information is used to find an interval between transmission of the third packet and any other packet from any other access point.

5. The method of claim 3, further comprising:

receiving, by the mobile device, information that specifies a location of the first access point.

6. The method of claim 3, wherein the fourth information is used to find an interval between transmission of the fourth packet and any other packet from any other access point.

7. The method of claim 5, further comprising:

receiving, by the mobile device, information that specifies a location of the second access point.

8. The method of claim 7, further comprising:

receiving, by the mobile device, information that specifies a time at which the third packet was transmitted from the third access point, and a location of the third access point;

wherein the information is used solely to find an interval between transmission of the third packet and any other packet from any other access point.

9. The method of claim 8, further comprising:

receiving, by the mobile device, information that specifies a time at which the fourth packet was transmitted from the fourth access point, and a location of the fourth access point;

wherein the information is used solely to find an interval between transmission of the fourth packet and any other packet from any other access point.

10. The method of claim 1, wherein the mobile device includes a Global Positioning System (GPS) receiver providing location data to the mobile device when the GPS receiver acquires signals from a minimum number of satellites needed to process GPS signals and produce location data.

11. The method of claim 1, wherein receiving the first packet from the first access point is in accordance with the IEEE 802.11 standard.

12. A method of determining a location of a mobile device, comprising:

receiving, by an anchor having a known location, a first packet from a first access point having a known location and generating a first time-stamp representing a time at which the first packet is received at the anchor;

receiving, by the anchor, a second packet from a second access point and generating a second time-stamp representing a time at which the second packet is received at the anchor;

determining a time of transmission of the first packet based on the first time-stamp, a speed of propagation of the first packet, and a distance between the anchor and the first access point;

determining a time of transmission of the second packet based on the second time-stamp, a speed of propagation of the second packet, and a distance between the anchor and the second access point; and transmitting, by the anchor to a mobile device having an initially unknown location, the time of transmission of the first packet, a location of the first access point, the time of transmission of the second packet, and a location of the second access point.

13. The method of claim 12, further comprising:

receiving, by the anchor having the known location, a third packet from a third access point having a known location and generating a third time-stamp representing a time at which the third packet is received at the anchor;

receiving, by the anchor, a fourth packet from a fourth access point and generating a fourth time-stamp representing a time at which the fourth packet is received at the anchor;

determining a time of transmission of the third packet based on the third time-stamp, a speed of propagation of the third packet, and a distance between the anchor and the third access point;

determining a time of transmission of the fourth packet based on the fourth time-stamp, a speed of propagation of the fourth packet, and a distance between the anchor and the fourth access point; and transmitting, by the anchor, the time of transmission of the third packet, a location of the third access point, the time of transmission of the fourth packet, and a location of the fourth access point.

14. The method of claim 12, wherein receiving the first packet is performed in accordance with the IEEE 802.11 standard.

15. A mobile device, comprising:

a receiver configured to receive a first packet transmitted from a first access point having a first known location, a second packet transmitted from a second access point having a second known location, and a third packet transmitted from a third access point having a third known location; and a processor, coupled to the receiver and configured to time-stamp the first packet received by the receiver, the second packet received by the receiver, and the third packet received by the receiver, wherein the receiver is further configured to receive, from an anchor, a time of transmission of the first, second and third packets as determined by the anchor, and wherein the processor is further configured to use the time of transmission of the first, second, and third packets to determine a time interval between transmission of the first, second, and third packets from the first, second, and third access points.

16. The mobile device of claim 15, wherein the receiver operates in accordance with the IEEE 802.11 standard.

17. The mobile device of claim 15, further comprising:

a Global Positioning System receiver, a Bluetooth transmitter and receiver, and a cellular telephone transmitter and receiver.

18. The mobile device of claim 15, wherein the receiver is further configured to receive a fourth packet transmitted from a fourth access point having a fourth known location, and wherein the processor is further configured to time-stamp the fourth packet received by the receiver.

19. The mobile device of claim 15, wherein the receiver is further configured to receive, from the anchor, the third known location of the third access point.

20. The mobile device of claim 19, wherein the mobile device is configured to determine a difference in distance between itself and each of the first, second, third and fourth access points.

21. The mobile device of claim 20, wherein the mobile device is configured to determine its location based on the difference in distance between itself and the first, second, third and fourth access points.

22. A method of determining a location of a mobile device having an initially unknown location, comprising:

receiving, by the mobile device, a first packet from a first access point and generating a first time-stamp representing a first time at which the first packet is received at the mobile device, wherein the first access point has a known location;

receiving, by the mobile device, a second packet from a second access point and generating a second time-stamp representing a second time at which the second packet is received at the mobile device;

receiving, by an anchor having a known location, the first packet from the first access point and generating a third time-stamp representing a third time at which the first packet is received at the anchor;

receiving, by the anchor, the second packet from the second access point and generating a fourth time-stamp representing a fourth time at which the second packet is received at the anchor;

determining, by the anchor, a time of transmission of the first packet based on the third time-stamp and a distance between the anchor and the first access point;

determining, by the anchor, a time of transmission of the second packet based on the fourth time-stamp and a distance between the anchor and the second access point;

receiving, by the mobile device, first information and second information from the anchor, the first information being representative of the time of transmission of the first packet and the second information being representative of the time of transmission of the second packet, the first and second information being used to find an interval between the transmission of the first and second packets from the first and second access points respectively;

determining, by the mobile device, a first flight-time of the first packet based upon the time of transmission of the first packet and a second flight-time of the second packet based upon the time of transmission of the second packet; and determining, by the mobile device, a difference between a distance from itself to the first access point based upon the first flight-time and a distance from itself to the second access point based upon the second flight-time to determine the location.

23. A system, comprising:

an anchor having a known location, and configured to receive a first packet transmitted from a first access point having a first known location, a second packet transmitted from a second access point having a second known location, and a third packet transmitted from a third access point having a third known location, and further configured to determine a time of transmission of each of the first, second and third packets;

a receiver having a location different from the known location of the anchor, and configured to receive the first packet, the second packet, and the third packet; and a processor, coupled to the receiver and configured to time-stamp the first packet received by the receiver, the second packet received by the receiver, and the third packet received by the receiver, wherein the receiver is further configured to receive, from the anchor, the time of transmission of each of the first, second and third packets, and wherein the processor is further configured to use the time of transmission of each of the first, second, and third packets to determine a time interval between transmission of the first, second, and third packets from the first, second, and third access points, respectively.

* * * * *